United States Patent [19]
Kida

[11] Patent Number: 5,907,829
[45] Date of Patent: May 25, 1999

[54] SCHEDULE MANAGEMENT SYSTEM AND RECORDING MEDIUM

[75] Inventor: Koji Kida, Tokyo, Japan

[73] Assignee: NEC Corporation, Japan

[21] Appl. No.: 08/782,517

[22] Filed: Jan. 9, 1997

[30] Foreign Application Priority Data

Jan. 10, 1996 [JP] Japan ............................... 8-1882

[51] Int. Cl.$^6$ ........................................ A01K 1/10
[52] U.S. Cl. ............................. 705/9; 395/200.61
[58] Field of Search ............... 705/9, 8, 11; 395/200.61, 395/200.68

[56] References Cited

U.S. PATENT DOCUMENTS 5,765,140  6/1998  Knudson et al. ........................ 705/9

FOREIGN PATENT DOCUMENTS 5-6378  1/1993  Japan .

*Primary Examiner*—Thomas R. Peeso
*Attorney, Agent, or Firm*—Ostrolenk, Faber, Gerb & Soffen, LLP

[57] ABSTRACT

A schedule management system is provided in which a requested task is not unconditionally accepted by the requesting schedule management system. The requested task may be accepted by the user's schedule management system by negotiating for the conditions under which the task will be completed so that the requested work can be allocated and accepted by mutual agreement between the schedule management systems of the requester and the requestee. The user's (requestee's) schedule management system negotiates for acceptable work conditions by evaluating the work load of the user based on the recorded personal schedule and calculating an acceptable completion day of the requested task. The requesting schedule management system then allocates the requested task to the user whose schedule management system is most likely to complete the task closest to the requested deadline based on the negotiation conditions transmitted from a plurality of user schedule management systems.

19 Claims, 9 Drawing Sheets

FIG.2

| WORK NAME | START SCHEDULED DAY | START SCHEDULE RESTRITION | DEAD LIINE | DEAD LIINE RESTRICTION | PRIORITY | WORK MAN-HOUR | WORK LIST | PROGRESS RATE | LEFT MAN-HOUR | PERFORMANCE SCHEDULED DAY LIST | EXECUTOR |
|---|---|---|---|---|---|---|---|---|---|---|---|
| USER REQUEST ANALYSIS | 95/11/07 | FREE | 95/11/10 | FREE | 3 | 2 | | 0 | 2 | 11/7,11/8,11/9 | KIDA |
| DRAWING UP GENERAL SPECIFICATIONS | 95/11/13 | FREE | 95/11/15 | FREE | 3 | 2 | USER REQUEST ANALYSIS | 0 | 2 | 11/13,11/14,11/15 | KIDA |
| DRAWING UP PATENT | 95/11/15 | FREE | 95/11/17 | FREE | 5 | 3 | | 0 | 3 | 11/15,11/16,11/15 | KIDA |
| DRAWING UP DEMONSTRATION DATA | 95/11/06 | FREE | 95/11/07 | FREE | 4 | 1 | | 50 | 0.5 | 11/6,11/7,11/8 | KIDA |
| ‥ | | | | | | | ‥ | | | ‥ | |

101 — CHANGE COLOR OF RESTRICTION OFFENSE PERFORMANSE DAY

FIG.3

| WORK ID | WORK NAME | START SCHEDULED DAY | START SCHEDULE RESTICTION | ... | EXECUTOR | PROGRESS EVALUATION | WORK COMPLETION CALUCULATED DAY | ... | DAILY AVERAGE PROGRESS |
|---|---|---|---|---|---|---|---|---|---|
| 001 | USER REQUEST ANALYSIS | 95/11/07 | FREE | ... | KIDA | 0 | 95/11/09 | ... | 0.67 |
| 002 | DRAWING UP GENERAL SPECIFICATIONS | 95/11/13 | FREE | | KIDA | 0 | 95/11/15 | | 0.67 |
| 003 | DRAWING UP PATENT | 95/11/15 | FREE | | KIDA | 0 | 95/11/17 | | 1.00 |
| 004 | DRAWING DEMONSTRATION DATA | 95/11/06 | FREE | | KIDA | 1 | 95/11/09 | | 0.25 |

SCHEDULE MANAGEMENT SYSTEM AND RECORDING MEDIUM

BACKGROUND OF THE INVENTION

The present invention relates to an art of a schedule management system and recording medium. More specifically, this invention relates to the schedule management system, wherein a request, acceptance and adjustment of a work are made when two or more works allocated to a group are done by two or more workers belonging to the group and schedules for the whole group and each worker are managed and the recording medium recorded in a computer program that can cause a computer to function the schedule management system.

Conventionally, the schedule management system, wherein a schedule for each worker belonging to a group and the like is adjusted and two or more works are done, has been disclosed in JP-A-6378/1993 "Schedule Management System" (referred to as Document 1, hereinafter). The Document 1, disclosed the schedule management system comprising the means of managing a schedule for each worker belonging to a group, the means of inquiring of another schedule management system on the network about a schedule and the means of responding to the inquiry from another schedule management system. As a result, free time of each worker in the schedule and a schedule for a meeting room can be retrieved so as to decide a meeting date and check the work progress of other workers.

The main purpose of the schedule management system in the Document 1 is to support the progress and management of the recorded work provided that the information on the work done by each worker is recorded. That is, the art is used to support scheduling on the condition that the work has been allocated to each worker.

However, as a matter of fact, one work is not always specifically allocated to one worker in everyday office work. Therefore, a work has to be allocated to a worker who can surely carry out any urgent work. On the other hand, when receiving a request for a new work, a requestee who takes the work has to consider his/her recorded schedule and inform whether he/she can accept the work request or not. Therefore, as disclosed in Document 1, disclosing the progress of the recorded work to other workers is not useful enough for scheduling in a group comprising two or more workers. It is necessary that decision of the proper worker for the work and selection of a new work has to be supported.

The purpose of the present invention is to solve the above-mentioned problems.

Moreover, the purpose of this invention is to provide a schedule management system that comprises the retrieval function of retrieving the proper requestee and the work allocation function of allocating a work by negotiation between the allocator and the requestee, and supports decision of the proper requestee for the work and selection of newly accepted work.

Furthermore, the purpose of this invention is to provide the schedule management system wherein the work load is displayed to the allocator and the requestee in order that the work schedule can be adjusted to balance busy time and free time.

In addition, the purpose of this invention is to provide a recording medium storing a computer program in which the above-mentioned schedule management system is executed.

The schedule management system of the present invention comprises the communication means of communicating with another schedule management system on the network as well as the schedule management means of managing a schedule of each worker who is a user, and further more comprises the negotiation means of negotiating the work conditions such as a deadline between the schedule management systems belonging to the allocator who allocates the work and the requestee who is the user. Therefore, the requestee does not unconditionally accept the work allocation put on by the allocator but both the allocator and the requestee can allocate and accept the work respectively by mutual agreement. The schedule management system further comprises the evaluation means of evaluating how busy the worker feels (referred to as the work load, hereinafter) based on the recorded each worker's schedule and the calculation means of calculating the completion day of the newly allocated work based on the evaluation result. As a result, the allocator can retrieve the proper requestee who surely meets the work deadline presented by the allocator. As described above, the conventional schedule management system is performed provided that the work has been allocated to each worker. On the contrary, the present management system further comprises the retrieval means of retrieving the proper requestee and the work allocation means of allocating the work by negotiation between the allocator and the requestee in order to support decision of the proper requestee for the work and selection of the newly accepted work. Moreover, the work load is disclosed to the allocator and the requestee who is the user therefore the each worker's schedule can be adjusted to balance the worker's busy time and free time.

BRIEF DESCRIPTION OF THE DRAWINGS

This and other objects, features and advantages of the present invention will become more apparent upon a reading of the following detailed description and drawings, in which:

FIG. 2 is a display example of work I/O means in the schedule management system of the present invention;

FIG. 3 is an example of a storage table of the work storage means in the schedule management system of the present invention;

DESCRIPTION OF THE EMBODIMENTS

The embodiments of the present invention are explained in detail, referring to the figures.

Figure 1:
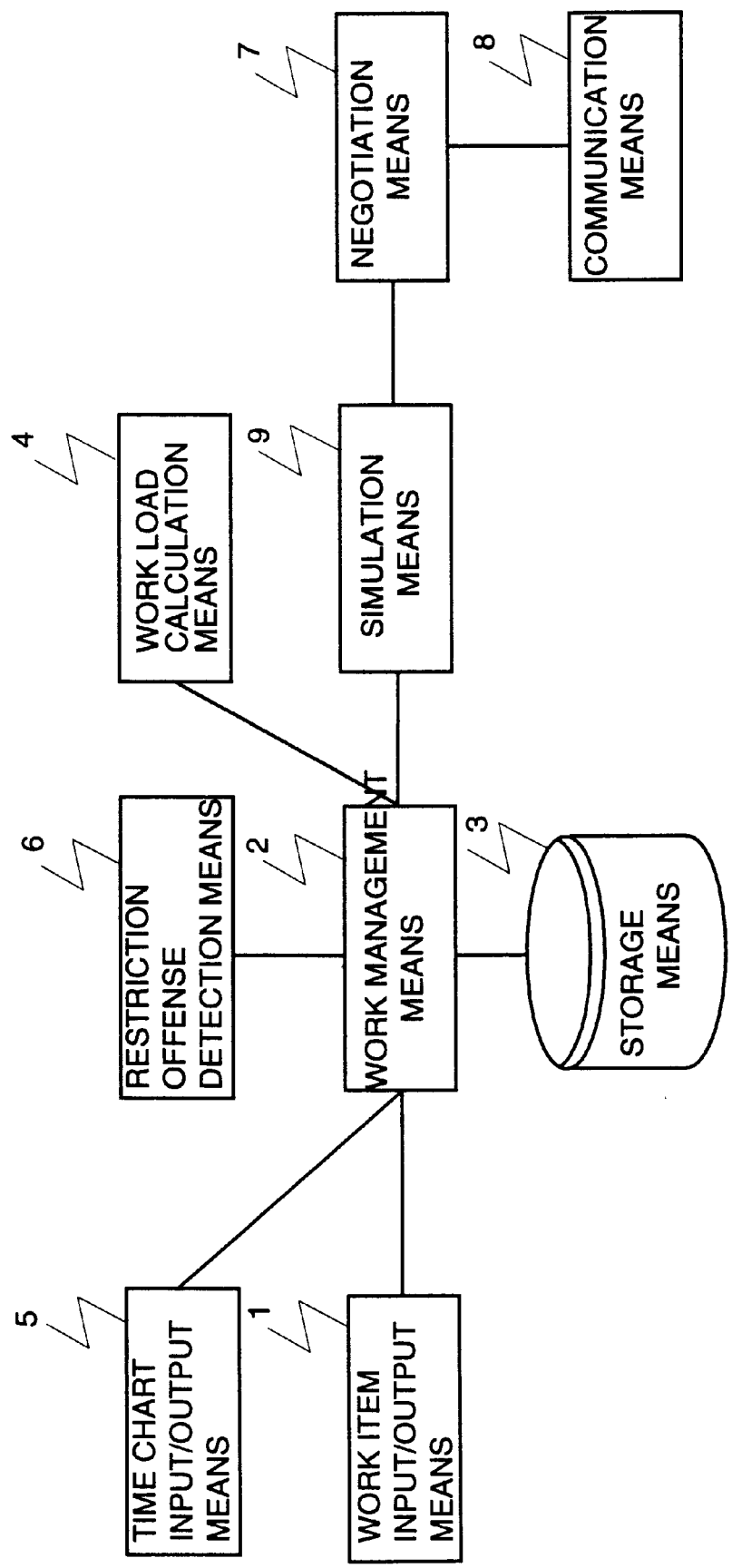
FIG. 1 is a block diagram showing the first embodiment of the schedule management system of the present invention.

The first embodiment of the schedule management system of the present invention is explained, referring to FIG. 1.

The illustrated schedule management system comprises the work item input/output means 1 for inputting the schedule of the work, the restriction such as the work priority, a performance schedule, and work data on the information about the work progress and displaying these inputs to the user, the work storage means 3 for storing the work data input by the work item input/output means 1, the work management means 2 for recording, updating, deleting, retrieving the work data stored in the work storage means 3, the work load calculation means 4 for calculating the work load based on two or more the work data stored in the work storage means 3, the restriction offense detection means 6 for detecting a performance schedule in which the restriction such as the work priority input by the work item input/output means 1 is not obeyed, the time chart input/output means 5 for displaying the work performance schedule on the time axis and displaying the work load calculated by the work load calculation means 4 and the restriction offense detected by the restriction offense detection means 6, the communication means 8 for communicating with the schedule management system that manages other workers' schedules, the negotiation means 7 for making a work request and response through the communication means 8 and the simulation means 9 for simulating the requested work so that the negotiation means 7 makes the response.

The basic functions in the first embodiment of the present invention is largely classified as follows:

1. to manage a work performance schedule for each worker
2. to allocate a work to another worker.

First, the item 1 is explained.

Each worker inputs his/her own work data with the work item input/output means 1. In this embodiment, the worker inputs the work data comprising the following items from one to twelve:

1. work name: The name of the work done by the worker is input in a character string;

2. start scheduled day: The scheduled day when the work will be started is input in the format, "year/month/day";

3. start schedule restriction: "Free" or "fixed" is selected for the start scheduled day and the selection result is input;

"Free" here means that the work is started a few days before or after the start scheduled day when the start scheduled day has been input and the work may be started any time before the deadline when the start scheduled day has not been input. The user records the number of days for the margin before or after the start scheduled day in advance as the deadline free period. "Fixed" means that the work must be stated on the start scheduled day.

4. deadline: The deadline of the work is input in the format, "year/month/day";

5. deadline restriction: "Free" or "fixed" is selected for the deadline and the selection result is input;

"Free" here means that the work is completed in a few days before or after the deadline, that is, the deadline free period when the deadline has been input and the work may be completed any time when the deadline has not been input. "Fixed" means that the work must be completed on the deadline.

6. priority: The work priority is input in five numerals ranging from the highest five to the lowest 1;

7. work man-hour: The work man-hour is input in the number of days required for completing the work provided that only the work has been processed all day long;

8. prior work list: The names of works that have to be completed before the new work is started are input in the format wherein commas are put among the work names, which indicates the restriction is put on the priority of the works.

9. progress rate: The progress is input in percentage. Zero is input for a new work;

10. left man-hour: The man-hour required until completion of the work is input. The same value as the work man-hour is input for a new work.

When the user who is also the worker considers a certain progress has been made in the work (at least at the end of the working day), the user inputs the item 9 or 10. At this time, The work item input/output means 1 automatically calculates the items that the user has not input using the expression below and inputs the calculation results to each item.

The expression for calculating the progress rate when the left man-hour has been input:

$$progress\ rate = (work\ man\text{-}hour - left\ man\text{-}hour) \div (work\ man\text{-}hour) \times 100.$$

The expression for calculating the left man-hour when the progress rate has been input:

$$left\ man\text{-}hour = (work\ man\text{-}hour) \times (1 - progress\ rate \div 100)$$

11. performance scheduled day list: The day when the work is scheduled to be performed in the period from the start scheduled day to the deadline is input in the format, "year/month/day". A scheduled day before the input day cannot be input and a performance scheduled day before the preset day is automatically deleted.

12. executor: The name of the worker who actually performs the work is input. The user's own name is input for the default value. The name of the requestee is input only when the work is allocated to another worker and accepted.

The display example of the work item input/output means 1 is shown in FIG. 2. On the display example in FIG. 2, the uncompleted work (that is, the work with the progress rate lower than 100 percents) is displayed in the table. Each row shows one work. Each column shows each item of the above-mentioned work data. For example, the work data in the second row indicates that the work name is "drawing up general specifications". The work man-hour is the whole two days. The executor Kida performs the new work after completing the work "user request analysis" from November 13 to 15 with the ordinary priority (3) and intends to complete the work on about November 16 as the deadline.

The worker moves the cursor to the item to which the value is to be input and inputs the value at the keyboard. A new value is input to any null row below the last row by moving the cursor. The work schedule restriction includes the start schedule restriction, the deadline restriction and the prior work list.

The work management means 2 receives the work data input by the worker from the work item input/output means 1 and stores the work data in the work storage means 3 after adding the following items 13 to 16 to the work items.

13. work ID: the ID for identifying the work of each worker;

14. progress evaluation: The present progress state is evaluated based on the state when the performance scheduled day was input to the performance scheduled day list for the first time (referred to as the initial schedule, hereinafter). The minus number of days is input when the progress is ahead of the schedule and the plus number of days is input when the progress is behind the schedule. For example, the value +2 means that the present progress is two days behind the initial schedule and two more performance days are required. The value −2 means that the present progress is two days ahead of the initial schedule and the work is completed two days before the initial schedule. The work management means 2 calculates the progress evaluation value. The worker adds the performance scheduled day to the performance scheduled day list when the progress is behind the schedule and deletes the performance scheduled day from the performance scheduled day list when the progress is ahead of the schedule. The progress evaluation is calculated as follows:

progress evaluation=(the number of days added to the performance scheduled day list)−(the number of days deleted from the performance scheduled day list)

For example, in the work name "drawing up demonstration data" of the fourth row in FIG. 2, two days (November 6 and 7) were initially allocated to the performance day and November 8 is added to the performance scheduled day list due to the delayed progress. As a result, the progress evaluation value for "drawing up demonstration data" is 1−0=1.

The work management means 2 calculates the progress evaluation at the timing of user's addition/deletion to/from the progress evaluation performance scheduled day list.

15. work completion calculated day: The work management means 2 calculates the work completion day based on the present progress state. The work management means 2 calculates the work completion day as follows:

When the prior work list is null,
the progress rate=0%
work completion calculated day=deadline
the progress rate≠0%;

work completion calculated day=(progress evaluation)÷((progress rate)÷100)+(deadline)

The work management means 2 adds the days from the deadline to the work completion scheduled day to the performance scheduled day list when the work completion calculated day>the deadline.

When the prior work list is not null,
The work with the latest work completion calculated day in the work data of the prior work list is called completion waiting work. First, the effect by the completion waiting work is calculated as follows:

the effects by the completion waiting work=Max (progress evaluation of completion waiting work+deadline of work completion waiting work−start scheduled day, 0)

Max(A, B) here means the larger value in A or B. The work completion calculated day is calculated as follows based on the above:
progress rate=0%;

work completion calculated day=(deadline)+(effect by completion waiting work)

progress rate≠0% work completion estimated day=(progress evaluation)÷(progress rate÷100)+(deadline)+(effect by completion waiting work)

For example, in the work "drawing up demonstration data" of the fourth row in FIG. 2, work completion calculated day=1÷(50÷100)+11/7+0=11/9

16. daily average progress: The work management means 2 calculates the average work progress made by the worker per day as follows:

progress rate=0%;

daily average progress=(work man-hour)÷(the number of elements in the performance scheduled day list)

progress rate≠0%;

daily average progress=(work man-hour)÷((the number of elements in the performance scheduled day list)+(work completion calculated day)−(the last day in the performance scheduled day list))

For example, in the work "drawing up demonstration data" of the fourth row in FIG. 2, daily average progress=1÷(3+11/9−11/8)=0.25

The example of storing the work data in the work storage means 3 is shown in FIG. 3. The table is drawn up by adding the above-mentioned items 13 to 16 to FIG. 2. The whole work data stored in the work storage means 3 is called schedule data for the worker.

The work management means 2 operates for the work storage means 3 as follows:

record [work item=value, work item=value . . . ]: A new work is recorded.

update [work ID, work item=value, work item=value . . . ]: The work to be changed is specified using the work ID and the item to be changed and its value are obtained in an argument retrieval [retrieval conditions]: The work that meets the retrieval conditions is retrieved and all the work items of the retrieved work are obtained.

The work load calculation means 4 calculates the daily work load based on the personal schedule data stored in the work storage means 3. The work load here means the working time on the day required for the worker to complete the work on schedule and more simply means how busy the worker feels. For example, the nine hours of the work load on the day means that the nine-hour work completes the work scheduled to be done today.

Figure 4:
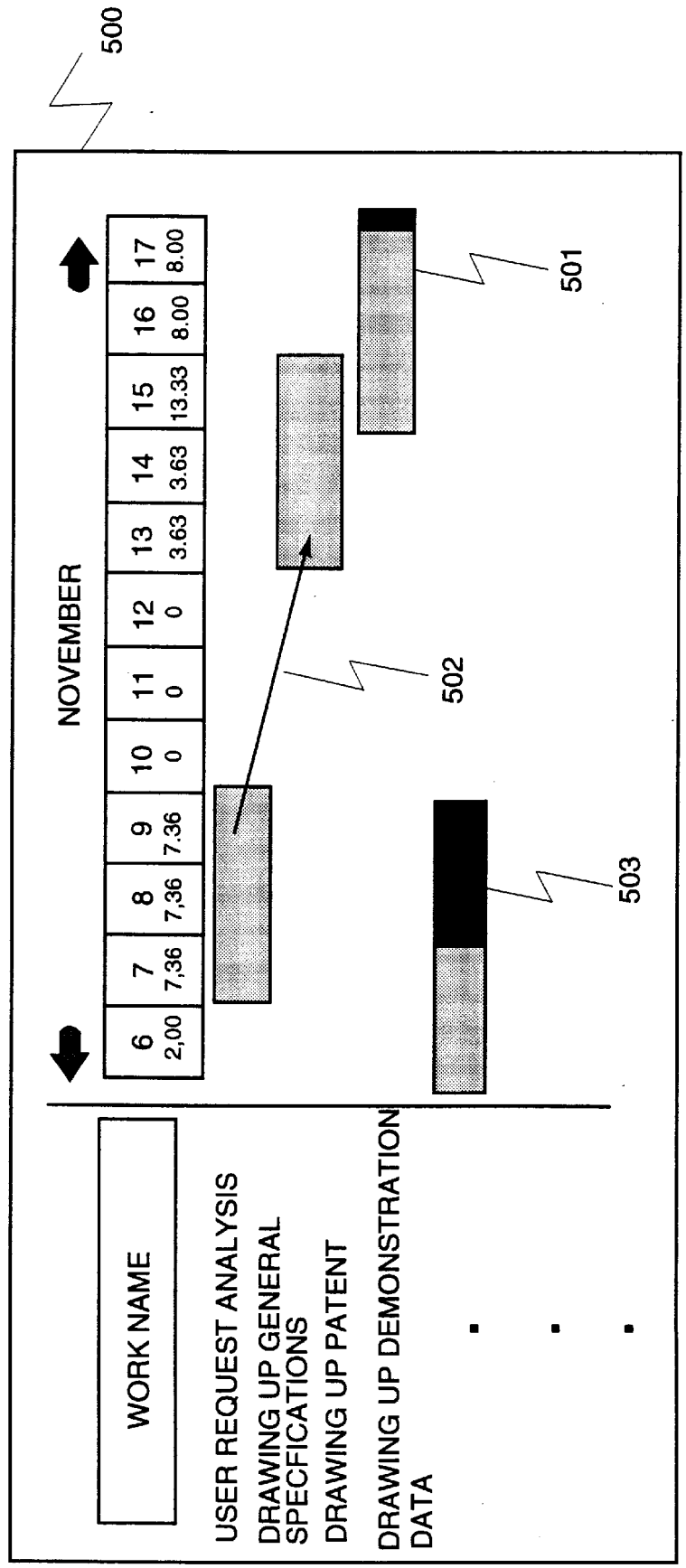
FIG. 4 is a balance example of the time chart I/O means in the schedule management system of the present invention.

The work load calculation means 4 calculates the work load as follows. The work load on November 8 in FIG. 3 and FIG. 4 is calculated in the examples below.

Step 1: The performance of the retrieval [performance scheduled day list, include, 11/8] operation that means to retrieve the work including November 8 in the performance scheduled day list is requested to the work management means 2 and the result (the set of works scheduled to be done today) is stored. In the example of November 8 in FIG. 4, the set of works scheduled to be done today is {user request analysis}.

Step 2: The performance of the retrieval [work completion calculated day, after, 11/8] operation that means the work is expected to be being performed on November 8 when the work is to be completed judging from the present progress state is requested to the work management means 2. The result is added to the set of works scheduled to be completed today. In the example of November 8 in FIG. 4, the set of works scheduled to be done today is {user request analysis, drawing up demonstration data}.

Step 3: The performance of the retrieval [executor, =, (user name)] operation that means the work performed by the user is requested to the work management means 2. The result (the set of works scheduled to be done by the user) is stored. In the example of November 8 in FIG. 4, the set of works scheduled to be done by the user is {user request analysis, drawing up general specifications, drawing up patent, drawing up demonstration data}.

Step 4: The product of the set of works scheduled to be done today and the set of works scheduled to done by the user is calculated. In the example of November 8 in FIG. 4, the set of products (the performance schedule set) is {user request analysis, drawing up demonstration data}.

Step 5: The user inputs the daily ordinary working hour (the standard working hour) in advance and the work load calculation means 4 stores the standard working hour. The work load is calculated based on the product=(the total of daily average progresses of works included in the performance schedule set)×(the standard working hour). In the example of November 8 in FIG. 4, the work load on November 8=(0.67+0.25)×8=7.36.

The work load calculation means 4 calculates the work load, at the same time, calculates the overtime working hours as follows:

(overtime working hour)=(work load)−(standard working hour)

The restriction offense detection means 6 detects the day when the work schedule restriction is not obeyed from the performance scheduled day list. Concretely, the performance scheduled day (the element of the performance scheduled day list) that meets the conditions below is detected as a restriction offense (the restriction offense performance scheduled day).

(1) the performance scheduled day with the deadline restriction "fixed" and after the deadline (2) the performance scheduled day with the start scheduled day restriction "fixed" and before the start scheduled day (3) the performance scheduled day with a work specified in the prior work list and before the work completion day of the work with the latest work completion calculated day (4) the performance scheduled day before today Next, the time chart input/output means 5 displays the following to the user:

(1) the graph on the time axis showing the performance scheduled days of each work for each day stored in the work storage means 3

(2) the work schedule restriction on the work stored in the work storage means 3

(3) the work load per day calculated by the work load calculation means 6

The display example of the time chart input/output means 5 is shown in FIG. 4. As shown in FIG. 4, the year/month/day is put on the horizontal axis and the work name is put on the vertical axis. The performance scheduled day (the day included in the performance scheduled day list) is displayed on the graph for each work. The value displayed under the year/month/day on the horizontal axis indicates the work load on the day. As illustrated in 501 of FIG. 4, when the performance start day or the deadline is "fixed", the bold line indicating "fixed" is displayed. As illustrated in 502 of FIG. 4, for the work with the prior work list filled in, the arrow is drawn from the deadline of the prior work to the start scheduled day of the work.

The time chart input/output means 5 can change the performance scheduled day for each work. When the performance scheduled day to be changed is clicked with the mouse, the performance schedule is set and clicking again cancels the set schedule. When the user inputs to change the performance scheduled day, the time chart input/output means 5 requests the work management means 2 to update the performance scheduled day list.

The work management means 2 requests the work load calculation means 4 to recalculate the work load whenever performing record or update operation for the work storage means 3, the time chart input/output means 5 to redisplay and the restriction offense detection means 6 to check a restriction offense.

The restriction offense detection means 6 receives the request from the work management means 2, detects the restriction offense performance scheduled day and transfers the restriction offense detection result in the format (work ID, restriction offense performance scheduled day) to the work item input/output means 1 and the time chart input/output means 5.

When receiving the restriction offense detection result, the work item input/output means 1 gives warning to the worker about the work identified with the work ID by changing the display color for the element that is included in the performance scheduled day list and is the restriction offense performance day (101 in FIG. 2). When receiving the restriction offense detection result, the time chart input/output means 5 gives warning to the worker about the work identified with the work ID by changing the color of the graph showing the restriction offense performance scheduled day (503 in FIG. 4).

As explained above, while the user inputs the work data by the work item input/output means, the work management means 2 updates the personal schedule data stored in the work storage means 3, the work lord calculation means 4 calculates the daily work load, the restriction offense detection means 6 detects the restriction offense performance scheduled day and the work input/output means 1 and the time chart input/output means 5 display the restriction offense performance scheduled day to the user. Therefore, the user can input the work item by referring to the schedule restriction offense and the work load displayed by the system.

Next, the negotiation for "2. to allocate a work to another worker" is explained.

Figure 5:
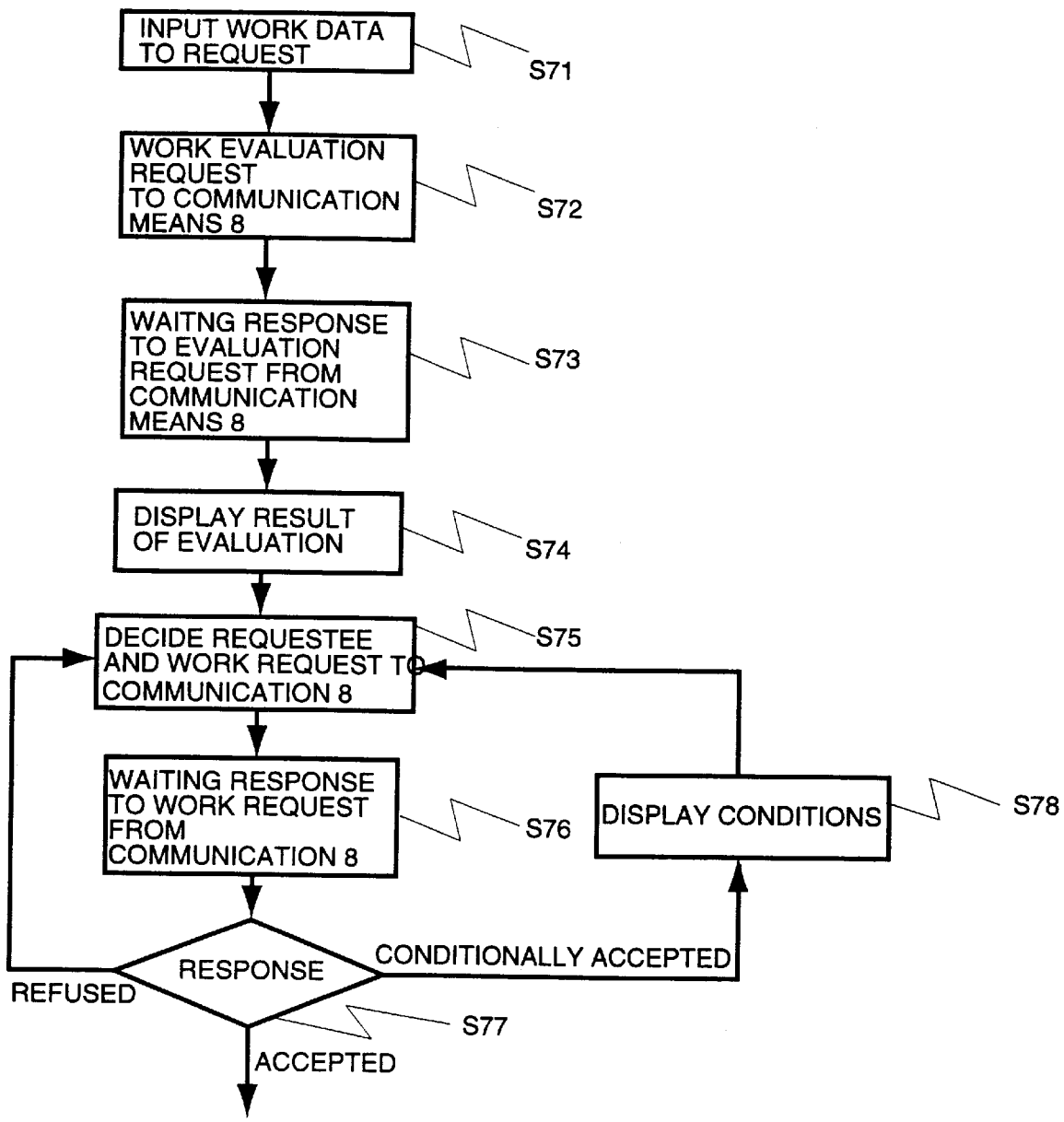
FIG. 5 is a flow chart of work request process performed by the negotiation means in the schedule management system of the present invention.

The negotiation means 7 allocates a work to another worker and makes the response to the work allocated from another worker. FIG. 5 is a flow chart showing the process of allocating a work to another user. First, the above-mentioned process is explained, referring to FIG. 5.

Figure 6:
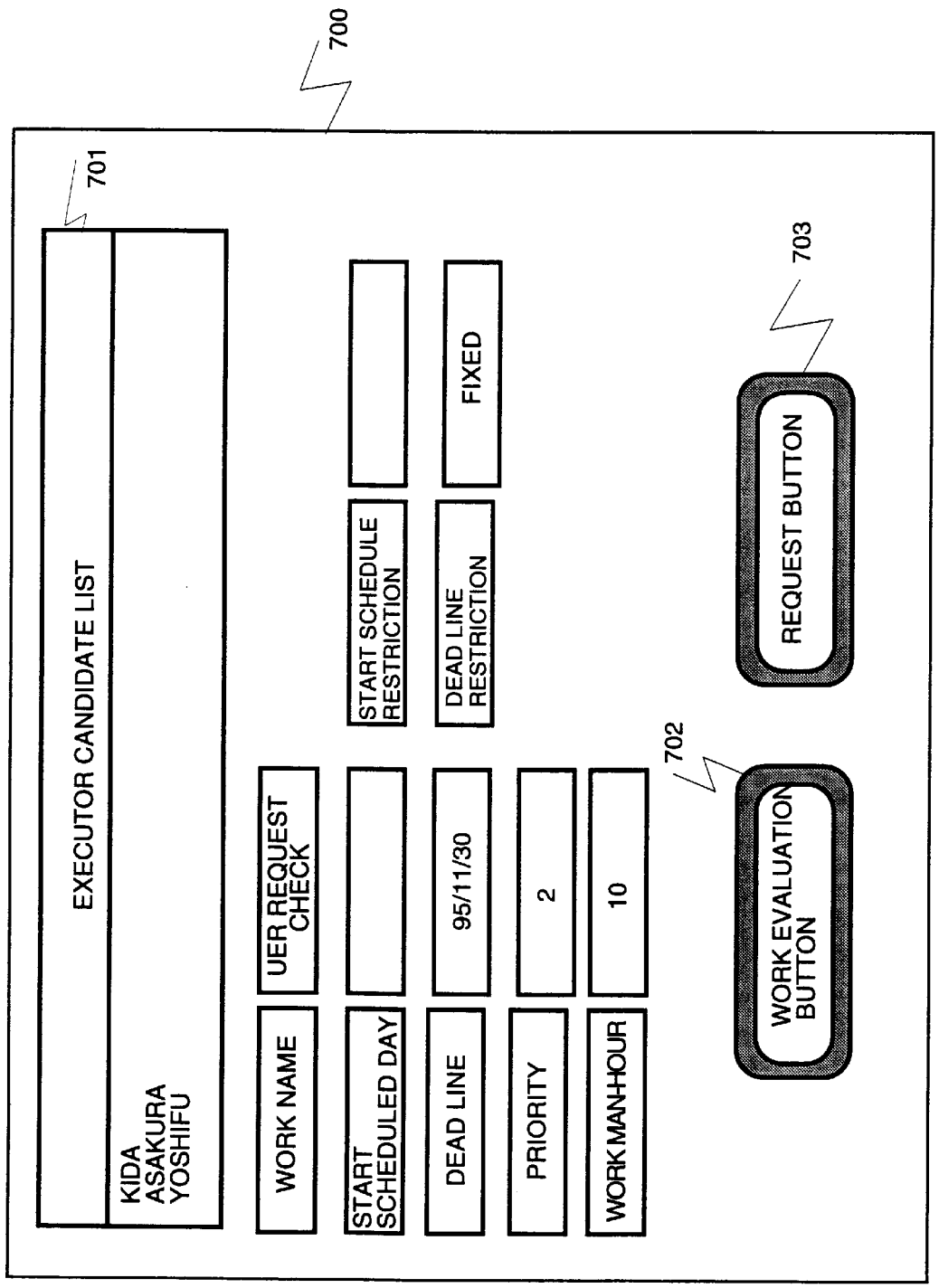
FIG. 6 is a display example of work request performed by the negotiation means in the schedule management system of the present invention.

StepS71: The work data to be allocated is input. In this example, the items of the work data to be allocated are 'work name', 'start scheduled day', 'start schedule restriction', 'deadline', 'deadline restriction', 'priority', 'work man-hour'. These items have the same meanings as the work data items input by the work input/output means 1. The example of the work request display is shown in FIG. 6. As illustrated in FIG. 6, the value of the item is input to the side of the item name by input means such as the keyboard. 'Start scheduled day' and 'start schedule restriction' have not to be input when they are not required to be specified. In addition, the user inputs 'executor candidate list' (701 of FIG. 6). The 'executor candidate list' here means the candidate for the work requestee and one candidate name is input to each row. Two or more rows are allocated to two or more candidate names.

StepS72: When the worker (the requestee) specified in the 'executor candidate list' accepts the work data input in StepS71, the user (the requester) pushes the work evaluation button 702 in FIG. 6 in order to calculate the work completion day. When the work evaluation button 702 is pushed, the negotiation means 7 describes the work evaluation request instruction in the format below and transfers the instruction to the communication means 8.

evaluation request [requester, requestee, work to be allocated]

The requester and the requestee are described in workers' names and the work to be allocated is described by putting commas among [work item=value]s.

StepS73: The response to the evaluation request instruction is waited. The response is transferred from the communication means 8 in the format below.

evaluation request response [requester, requestee, ordinary completion calculated day]

The requester and the requestee are described in workers' names and the ordinary completion calculated day means the completion calculated day when the work performance schedule recorded as the schedule data by the requestee and is described in the format of year/month/day.

For example, the evaluation request response ["Miyashita", "Kida", 95/11/17] means that the requestee "Kida" can complete the work allocated by the requester "Miyashita" on about Nov. 17, 1995.

StepS74: When the responses are returned from all the requestees included in the executor candidate list, the result is displayed in the column of the executor candidate list 701 in FIG. 6 in the format below:

user name: ordinary completion calculated day

In the example above, "Kida: 95/11/17" is displayed.

StepS75: The requester decides the requestee by referring to the display in StepS74 and deletes the candidates other than the requestee from the 'executor candidate list'. The requester also changes the item of the work data such as the deadline if necessary and pushes the request button 703. When the request button is pushed, the negotiation means 7 describes the work request instruction in the format below and transfers the instruction to the communication means 8.

work request [requester, requestee, work to be allocated, ordinary completion calculated day]

The requester and the requestee are described in workers' names and the work to be allocated is described by putting commas among 'work item=value's.

StepS76: The response to the work request instruction is waited. The response is transferred from the communication means 8 in the format below.

work request response [requester, requestee, response, change conditions]

The requester and the requestee are described in workers' names and the response means the response made when the work request is accepted. The response in this example is any of 'accepted', 'refused', 'conditionally accepted'. 'Accepted' means that the worker who is the requestee accepts the allocated work and records the work as a new work in the schedule management system. 'Refused' means that the allocated work cannot be accepted. 'Conditionally accepted' means that the change in the work item such as the deadline is specified in the change conditions and when the change can be made as specified, the work request is accepted and otherwise refused. The change conditions are described by putting commas only among 'work item= value' to be changed. For example, when the deadline is changed to Nov. 21, 1995 and the deadline restriction is changed to "free", the change conditions are described as follows; deadline=95/11/21, deadline restriction="free". In the case of 'conditionally accepted', the allocated work is not recorded in the requestee's schedule management system. In the case of 'accepted' or 'refused', the change condition is null.

StepS77: When the response is 'accepted', the instruction below is sent to the work management means 2 in order to record the value of the work item 'executor' as the user who is the requestee.

record [work to be allocated]

The 'work to be allocated' here is described by adding 'executor=accepted user name' to the 'work to be allocated' in StepS75. When the response is 'refused', the process returns to StepS75 and the requester changes the requestee or the item value of the work to be allocated and makes a request again.

As explained above, the user (the requester) who allocates the work keeps changing the user who is the requestee and the work item value as considering the change conditions from the requestee user until receiving the response 'accepted' from the requestee user.

Next, the process of creating the evaluation request response and the work request response by the negotiation means 7 in this schedule management system of the requestee user is explained. First, the evaluation request response is explained.

The negotiation means 7 transfers the evaluation request [requester, requestee, work to be allocated] transferred from the communication means 8 to the simulation means 9 in order to calculate the ordinary completion calculated day for the allocated work.

The means of calculating the ordinary completion calculated day by the simulation means 9 is explained.

The man-hour margin (X) that means the free time on the X day is defined as follows:

$$\text{man-hour margin }(X)=Max(\text{standard working hour}-\text{work load }(X), 0)$$

The man-hour margin (X) means the work load on the X day and calculated by inquiring of the work load calculation means 4.

The man-hour margin total (X) that means the total of free time from today to the X day is defined as follows.

$$\text{man-hour margin total }(X)=\text{man-hour margin (today)}+\text{man-hour margin (tomorrow)}+\ldots+\text{man-hour margin }(X)$$

The simulation means 9 calculates the man-hour margin total (X) by increasing the X value in the order of date, from today to the future, and the X that meets 'man-hour margin total (X)>work man-hour of the allocated work' is specified as the ordinary completion calculated day.

Figure 7:
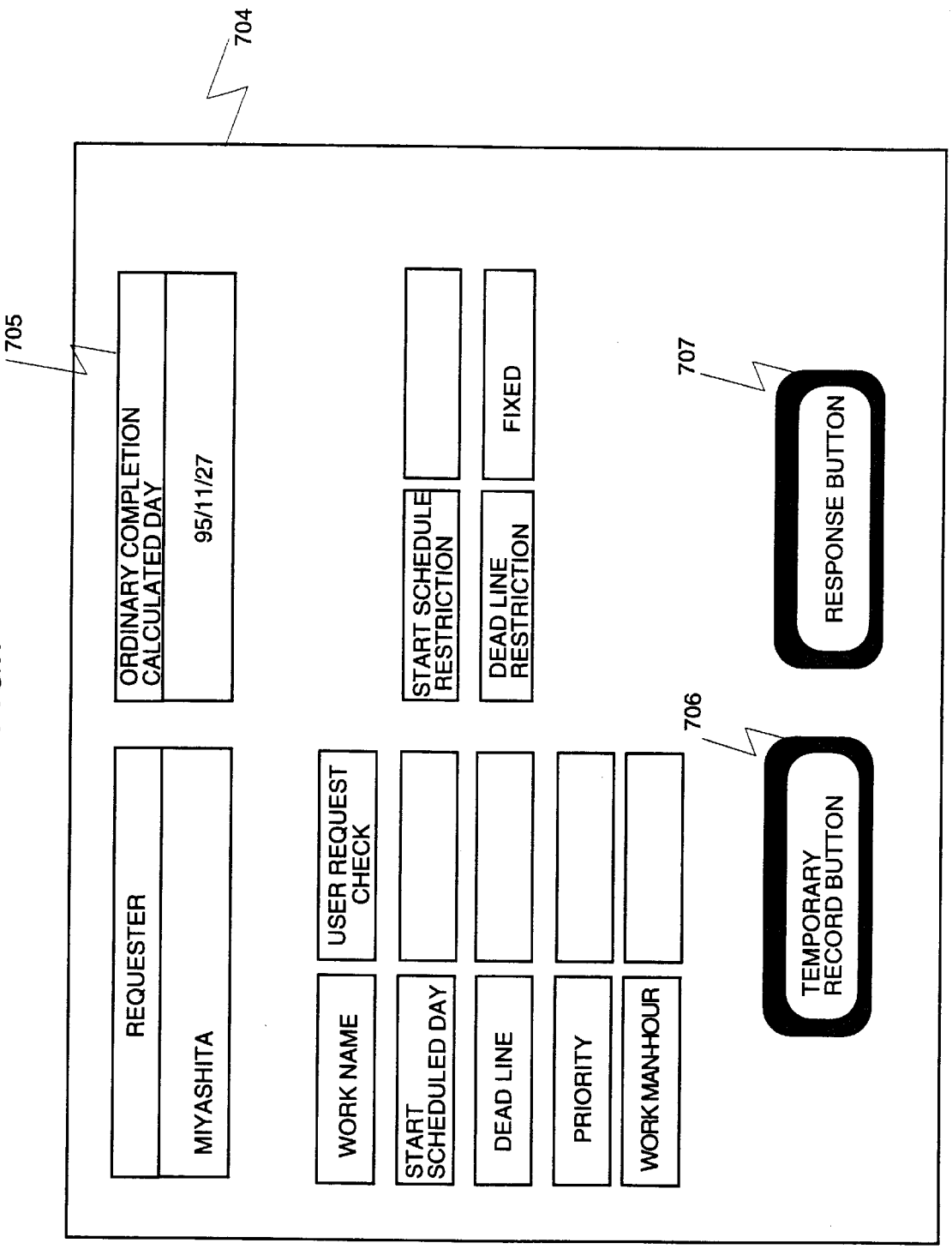
FIG. 7 is a display example displayed when a work request made by the negotiation means in the schedule management system of the present invention is accepted.

Next, the work request response is explained. The negotiation means 7 receives the work request [requester, requestee, work to be allocated, ordinary completion calculated day] from the communication means 8 and displays the allocated work and the ordinary completion calculated day to the requestee. FIG. 7 is the display example displayed when the work request is accepted. The allocated work is displayed in the format 'work item: value' and the ordinary completion calculated day is displayed on the display 705. When the temporary record button 706 in FIG. 7 is pushed in order to see the acceptance of the allocated work, the negotiation means 7 requests the record operation for the allocated work to the work management means 2 and the work ID is stored. The performance scheduled day list of the allocated work is null, therefore the time chart input/output means 5 displays only the work name and the deadline. The requestee inputs the performance scheduled day of the allocated work by the time chart input/output means 5, checks whether the work load has been changed after the input and decides whether the requested work is accepted or not by examining the change in the performance scheduled day list of another work and the like.

Figure 8:
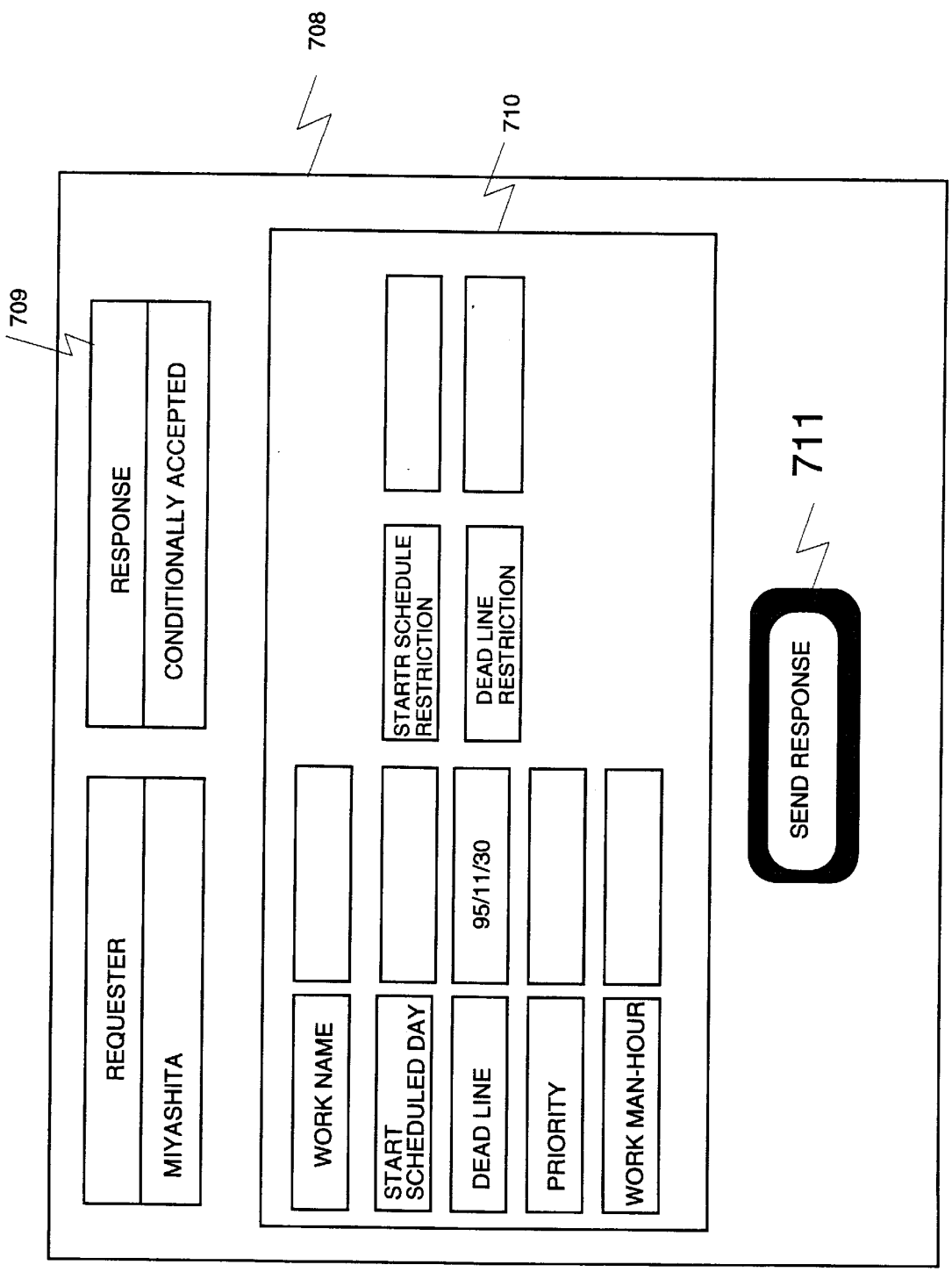
FIG. 8 is a display example of response creation performed by the negotiation means in the scheduled management system of the present invention.

When the requestee pushes the response button 707 in FIG. 7, the negotiation means 7 displays the dialog for inputting the response. FIG. 8 is the example of the dialog for inputting the response. Any of the responses 'accepted', 'refused', 'conditionally accepted' is input to the response area 709 in FIG. 8. In the case of 'conditionally accepted', only the item to be changed is input to the condition input area 710 in FIG. 8. When the requester pushes the button 711 for sending the response, the negotiation means 7 creates the work request response [requester, requestee, response, change condition] based on the requestee's input data in the response input dialog, transfers the response to the communication means 8 and outputs the response to the requester's schedule management system.

Figure 9:
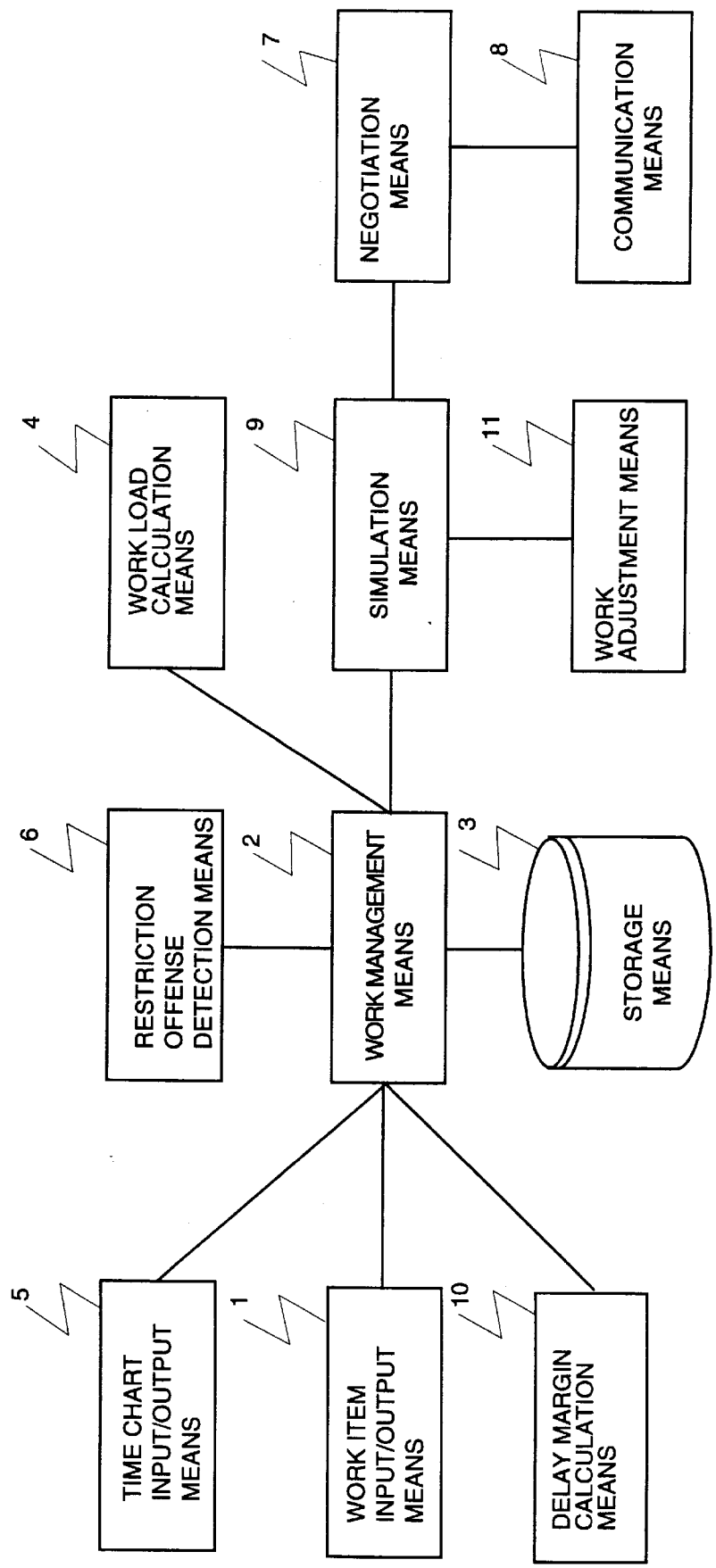
FIG. 9 is a function block diagram showing the first embodiment of the schedule management system of the present invention.

Next, the second embodiment of the schedule management system in the present invention is explained, referring to FIG. 9. In the illustrated schedule management system, the delay margin calculation means 10 for calculating the number of days that delays the deadline for each work as long as the progress of another work is not obstructed and the work adjustment means 11 for simulating the completion calculated day when a work is managed to be completed as early as possible by changing the work performance schedule recorded as the schedule data are added to the schedule management system in FIG. 1.

First, the following item is added to the work data items stored in the work storage means 3.

17. delay margin: means the allowed number of days for delaying the dead line. When performing record or update operation for the work storage means 3, the work management means 2 requests the delay margin calculation means 10 to calculate the delay margins for all the works and the delay margins are stored in the work storage means 3. The delay margin calculation means 10 calculates the delay margin as follows:

deadline restriction=fixed
delay margin=0
deadline restriction=free

Provided that the deadline of the work is delayed by X days, the maximum X in the deadline free period when the restriction offense performance scheduled day detected before or after the deadline by the restriction offense detection section 6 is not changed is calculated. The delay margin is calculated as follows:

Step 1: The restriction offense performance scheduled day and the deadline are stored.

Step 2: temporary variable X=1

Step 3: The deadline is delayed by X days and update of the work is requested to the work management means 2.

Step 4: Calculation of the restriction offense performance scheduled day is requested to the restriction offense detection section 6.

Step 5: The restriction offense performance scheduled day stored in Step 1 and the result of Step 3 are compared and
1) When the compared values are the same and X<deadline free period, the X value is increased by 1 and the process returns to Step 3.
2) When the compared values are the same and X=deadline free period, delay margin=deadline free period is specified and the calculation ends.
3) When the compared values are different, delay margin=X-1 is specified and the calculation ends.

Next, the evaluation request response instruction transferred from the communication means 8 to the negotiation means 7 in Step 73 of FIG. 5 explained in the first embodiment is expanded as follows:

evaluation request response [requester, requestee, ordinary completion calculated day, adjustment completion calculated day]

The adjustment completion calculated day means the completion calculated day when the work is managed to be completed as early as possible by changing the work performance schedule stored as the schedule data by the requestee and is described in the format of year/month/day.

For example, the evaluation request response ["Miyashita", "Kida", 95/11/17, 95/11/15] means that the requestee "Kida" can usually complete the work allocated by the requester "Miyashita" on about Nov. 17, 1995 and when another schedule is adjusted, the allocated work can be completed on Nov. 15, 1995.

Moreover, StepS74 is expanded as follows and displayed to the user.

user name: adjustment completion calculated day~ordinary completion calculated day In the above example, Kida: 95/11/15~95/11/17 is displayed.

As explained above, when making a work request, the user can obtain the completion calculation calculated in consideration for schedule adjustment.

When the evaluation request instruction is transferred from the negotiation means 7, the simulation means 9 calculates the ordinary completion calculated day and at the same time, requests the adjustment means 11 to calculate the adjustment ordinary completion calculated day. The adjustment means 11 calculates the adjustment ordinary completion calculated day as follows:

Step 1: The deadline of the work with the priority lower than that of the allocated work is delayed by the delay margin days.

Step 2: Each element in the performance scheduled day list of the work with the priority lower than that of the allocated work is delayed by the delay margin days.

Step 3: The change request is sent to the work management means 2 in order to reflect the above-mentioned changes on the work storage means 3.

Step 4: The ordinary completion calculation is requested to the simulation means 9 and the result is specified as the adjustment completion calculation.

Step 5: All the changed works are returned to the original states by turning back the schedules delayed by delay margin days in Steps 1, 2 and 3.

The schedule management system in the present system has the following effects.

1. When the work to be allocated will be completed can be simulated for each worker in advance, therefore the requester can allocate the work to the proper worker suitable for the requester's schedule.

2. The requester and the requestee negotiate for the work request, therefore the both can request and accept the work under the acceptable conditions such as the deadline.

3. The acceptance conditions are described in the response from the requestee, therefore the requester can readily adjust the work to be allocated.

4. The work load is shown to the worker, therefore the worker can balance the busy time and the free time.

What is claimed is:

1. A schedule management system for managing a schedule of a worker based on information of work done by said worker and for requesting and accepting a work with a computer through a network, said system comprising:
   a first schedule management system for managing a schedule of a requester; and
   a second schedule management system for managing a schedule of a requestee, wherein said first schedule management system comprises inquiring means for inquiring as to a possibility of performing a requested work to said second schedule management system; and said second schedule management system comprises checking and replying means for checking whether or not said requested work can be accepted based on a recorded and managed schedule of said requestee, and for transmitting the checking result to said first schedule management system.

2. The schedule management system of claim 1, wherein said second schedule management system comprises means for simulating the requestee's schedule when the requestee accepts a requested work, checking whether or not said requested work can be accepted based on said simulation result, and for transmitting the checking result to said first schedule management system.

3. The schedule management system of claim 1, wherein said second schedule management system comprises means for transmitting work conditions for accepting a requested work with a response about acceptance of said requested work to said first schedule management system.

4. The schedule management system of claim 1, wherein said second schedule management system comprises means for calculating a completion day of said requested work, and for transmitting said calculation result to said first schedule management system with a response about acceptance of said requested work.

5. The schedule management system of claim 1, wherein said second schedule management system comprises means for changing a recorded schedule in order to perform a requested work.

6. The schedule management system of claim 5, wherein said means for changing comprises means for changing a work deadline based on information about said work deadline and a favorable possibility that said work deadline can be moved.

7. The schedule management system of claim 1, wherein said first schedule management system further comprises allocation means for allocating the requested work to said second schedule management system of the requestee upon acceptance of the requested work by said second schedule management system.

8. A schedule management system for managing a schedule of a worker based on information of work done by said worker with a computer through a network and for requesting and accepting a work, said system comprising:

work item input/output means for inputting work data that is information of work and for displaying said input data of a worker;

storage means for storing schedule data that is a set of data for said worker including said work data;

work management means for recording, updating, deleting, retrieving said work data from said work storage means;

work load calculation means for calculating work load based on said work data stored in said work storage means;

restriction offense detection means for detecting work data that is against a restriction from said work data input by said work item input/output means;

time chart input/output means for displaying a performance schedule of work based on time, said work load being calculated by said work load calculation means and said restriction offense being detected by said restriction offense detection means;

communication means for communicating with a schedule management system that manages other workers' schedules through a network;

negotiation means for requesting a work and generating a response to said requested work;

simulation means for simulating an acceptance of said requested work based on said schedule data stored in said storage means so that said negotiation means can determine said response.

9. The schedule management system of claim 8, wherein when receiving a request for work from another worker's schedule management system through said communication means, said simulation means comprises means for checking an effect produced if said requested work is actually accepted by referring to said schedule data stored in said storage means, and wherein said negotiation means comprises means for generating said response to said requested work by referring to said checked effect and outputting said response to said schedule management system that requested said work with said communication system.

10. The schedule management system of claim 8, further comprising means for changing schedule data stored in said storage means in order to perform said requested work, and wherein said simulation means comprises means for generating a response to said request work based on said changed schedule data.

11. The schedule management system of claim 8, further comprising delay margin calculation means for calculating a delay margin that is a time data representing an allowable delay time of other work data stored in said storage means such that the other work is not affected based on a performance schedule included in the work data, wherein said work management means comprising means for adding said delay margin to the work data to be recorded through said margin calculating means when recording said work data obtained from said work item input/output means is said storage means as a schedule data, and said simulation means comprising means for generating a response to said requested work in consideration of said delay margin of said schedule data.

12. The schedule management system of claim 8, wherein said work data comprises a schedule of work done by said worker, a performance schedule including said restriction on a priority of said work and deadline information, and data on work progress and a name of said worker doing said work.

13. A recorded medium, having recorded thereon executable instructions representing a computer program that can cause a computer to perform a method of a management system for managing a worker's work-data and requesting and accepting a work via network, said recorded medium being readable by said computer, said method comprising the steps of:

requesting a work, said requesting being performed by a first schedule management system of a requester to a second schedule management system of a requestee;

checking whether or not said work requested can be accepted, based on said requestee's schedule managed by said second schedule management system, said checking being performed by said second schedule management system; and transmitting a checking result of said work requested to said first schedule management system.

14. The recording medium of claim 13, said method further comprising the steps of:

simulating a requestee's schedule by said second schedule management system if a requested work is accepted;

checking whether or not said requested work can be accepted based on said simulation result by said second schedule management system; and transmitting whether said requested work can be accepted based on said checking result to said first schedule management system.

15. The recording medium of claim 13, said method further comprising a step of:

transmitting conditions for a requestee to accept a requested work as a reply as to whether or not said requested work is acceptable, said transmitting being performed by said second schedule management system to said first schedule management system.

16. The recording medium of claim 13, said method further comprising a step of:

transmitting a calculated completion day of a requested work if the requestee were to accept said requested work as a reply as to whether or not said requested work is acceptable, said transmitting being performed by said second schedule management system to said first schedule management system.

17. The recording medium of claim 13, said method further comprising a step of:

changing a recorded schedule in order to perform a requested work by said schedule management system.

18. The recording medium of claim 13, said method further comprising a step of:

changing a work deadline for finishing work based on information of said work deadline and on a favorable possibility of changing said work deadline by said second schedule management system.

19. The computer-readable media of claim 13, said method further comprising the steps of:

requesting a possibility of performing work of said second schedule management system of each requestee;

simulating and checking the possibility of performing said requested work and transmitting a checking result to said first schedule management system in said each second schedule management system; and requesting a work of a second schedule management system that has transmitted a most favorable possibility of performing the requested work among said checking results in said first schedule management system.

* * * * *